United States Patent
Fossum et al.

(10) Patent No.: US 9,232,163 B2
(45) Date of Patent: Jan. 5, 2016

(54) DEPTH PIXEL OF THREE-DIMENSIONAL IMAGE SENSOR AND THREE-DIMENSIONAL IMAGE SENSOR INCLUDING THE SAME

(71) Applicant: Samsung Electronics Co., Ltd., Suwon-Si, Gyeonggi-Do (KR)

(72) Inventors: Eric R. Fossum, Wolfeboro, NH (US); Yibing Michelle Wang, Pasadena, CA (US); Tae-Yon Lee, Seoul (KR); Yoon-Dong Park, Osan-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 204 days.

(21) Appl. No.: 14/140,824

(22) Filed: Dec. 26, 2013

(65) Prior Publication Data

US 2014/0183338 A1    Jul. 3, 2014

(30) Foreign Application Priority Data

Dec. 27, 2012    (KR) .................. 10-2012-0154733

(51) Int. Cl.
| | |
|---|---|
| H04N 5/341 | (2011.01) |
| H04N 5/3745 | (2011.01) |
| G01S 17/89 | (2006.01) |
| G01S 7/491 | (2006.01) |

(52) U.S. Cl.
CPC ............ *H04N 5/3745* (2013.01); *G01S 7/4914* (2013.01); *G01S 17/89* (2013.01)

(58) Field of Classification Search
CPC ...... H04N 5/3745; G01S 7/4914; G01S 17/89
USPC ................................ 250/208.1, 214.1, 214 R
See application file for complete search history.

(56) References Cited

U.S. PATENT DOCUMENTS

| | | | |
|---|---|---|---|
| 6,683,676 B1 | 1/2004 | Seo | |
| 7,230,685 B2 | 6/2007 | Suzuki et al. | |
| 7,601,992 B2 | 10/2009 | Hashimoto et al. | |
| 8,009,871 B2* | 8/2011 | Rafii | G06K 9/00201 |
| | | | 250/559.07 |
| 8,619,122 B2* | 12/2013 | Gilboa | H04N 13/0029 |
| | | | 348/43 |
| 2010/0231891 A1 | 9/2010 | Mase et al. | |
| 2010/0277622 A1 | 11/2010 | Fossum et al. | |
| 2010/0290028 A1 | 11/2010 | Tachino et al. | |

FOREIGN PATENT DOCUMENTS

| | | |
|---|---|---|
| JP | 2001-108418 A | 4/2001 |
| KR | 2009-0097416 A | 9/2009 |
| KR | 2011-0051391 A | 5/2011 |

* cited by examiner

*Primary Examiner* — Seung C Sohn
(74) *Attorney, Agent, or Firm* — Harness, Dickey & Pierce, P.L.C.

(57) ABSTRACT

A depth pixel includes a photo detection unit, an ambient light removal current source, a driving transistor and a select transistor. The photo detection unit is configured to generate a light current based on a received light reflected from a subject, the received light including an ambient light component. The ambient light removal current source configured to generate a compensation current indicating the ambient light component in response to a power supply and at least one compensation control signal. The driving transistor is configured to amplify an effective voltage corresponding to the light current and the compensation current. The select transistor configured to output the amplified effective voltage in response to a selection signal, the amplified effective voltage indicating a depth of the subject.

20 Claims, 16 Drawing Sheets

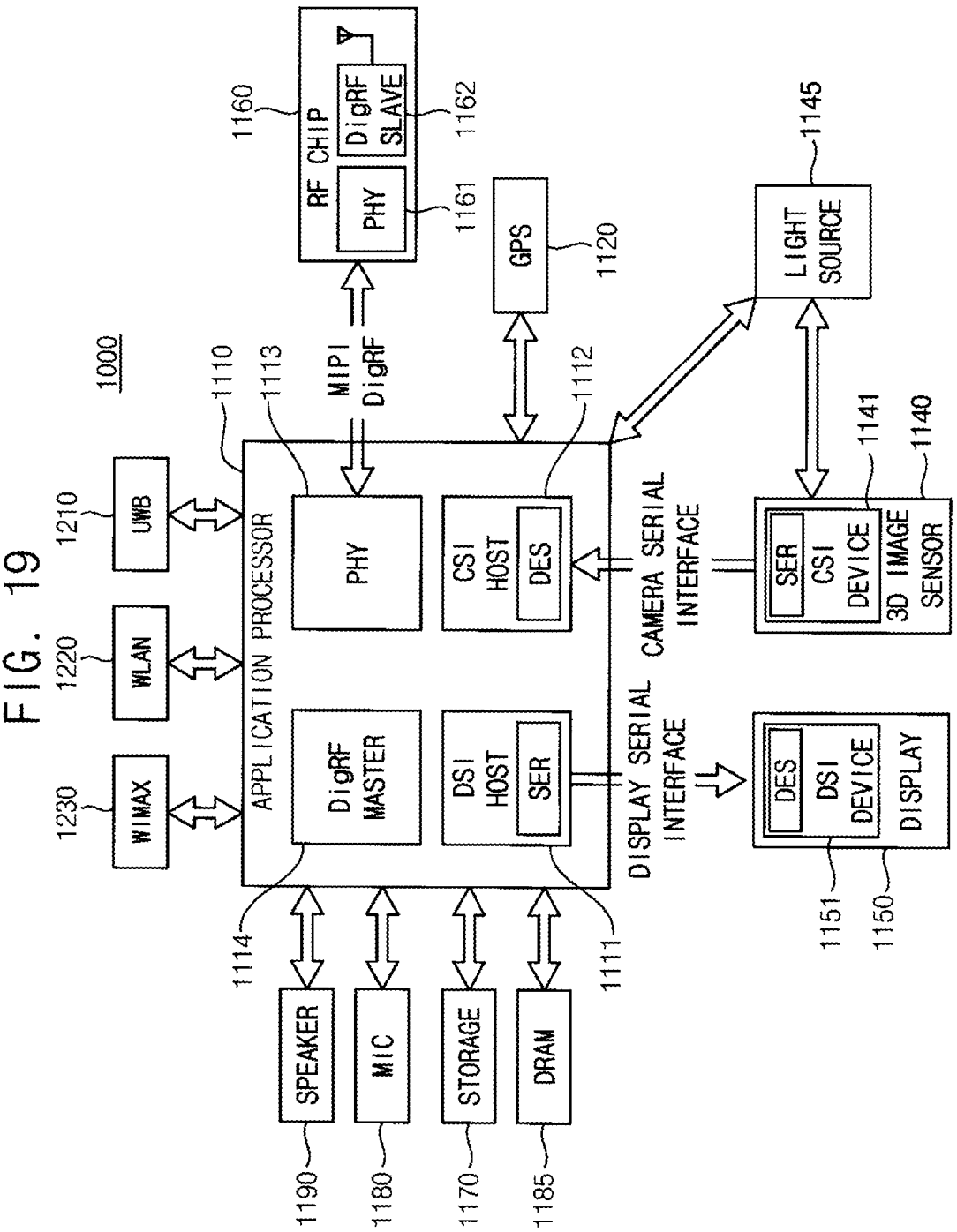

(12) United States Patent

DEPTH PIXEL OF THREE-DIMENSIONAL IMAGE SENSOR AND THREE-DIMENSIONAL IMAGE SENSOR INCLUDING THE SAME

CROSS-REFERENCE TO RELATED APPLICATION

This application claims priority under 35 USC §119 to Korean Patent Application No. 2012-0154733, filed on Dec. 27, 2012, in the Korean Intellectual Property Office (KIPO), the contents of which are herein incorporated by reference in their entirety.

BACKGROUND

1. Technical Field

Example embodiments relate to a depth pixel of a three-dimensional image sensor and the three-dimensional image sensor including the same.

2. Description of the Related Art

An image sensor is a semiconductor device configured to convert an optical signal, received incident to the image sensor from the outside, into an electrical signal, and provides image information corresponding to the optical signal. Recently, research on a three-dimensional image sensor for providing distance information as well as image information based on the optical signal has been actively performed. In general, the three-dimensional image sensor may measure distances between depth pixels and a subject by measuring a Time Of Flight (TOF), which is a travel time of a laser pulse taken until the laser pulse reflected back to its origination after irradiation onto the subject.

SUMMARY

Some example embodiments provide a depth pixel of a three-dimensional image sensor, capable of exactly measuring a distance to a subject even when an ambient light is relatively strong.

Some example embodiments provide a three-dimensional image sensor capable of exactly measuring a distance to a subject even when an ambient light is relatively strong.

According to example embodiments, a depth pixel includes a photo detection unit, an ambient light removal current source, a driving transistor and a select transistor. The photo detection unit generates a light current based on a received light reflected from a subject. The ambient light removal current source generates an ambient light component included in the received light in response to a power supply and at least one compensation control signal. The driving transistor amplifies an effective voltage corresponding to the light current and the compensation current. The select transistor outputs the amplified effective voltage as depth information in response to a selection signal.

The ambient light removal current source may include a first transistor connected between the power supply and the photo detection unit and including a gate terminal to which a first compensation control signal is applied. The driving transistor and the select transistor may include a first type transistor and the first transistor may include a second type transistor different from the first type transistor.

The first compensation control signal may be activated in a preset period, and a magnitude of the compensation current may be inversely proportional to a period of the first compensation control signal and proportional to a length of an activation period of the first compensation control signal.

The period and an activation level of the first compensation control signal may be changed depending on an ambient light.

The ambient light removal current source may include a second transistor and a third transistor. The second transistor may be connected between the power supply and the first transistor and may include a gate terminal to which a second compensation control signal is applied. The third transistor may be connected between the first transistor and the photo detection unit and may include a gate terminal to which a third compensation control signal is applied. The second transistor and the third transistor may include the second type transistor, respectively.

The first compensation control signal may maintain an activation state, and the second compensation control signal and the third compensation control signal may be sequentially activated.

The depth pixel may further include a transfer transistor and a reset transistor. The transfer transistor may be connected between the photo detection unit and a floating diffusion node and may include a gate terminal to which a transfer control signal is applied. The reset transistor may be connected between the power supply and the floating diffusion node and may include a gate terminal to which a reset signal is applied. A gate terminal of the driving transistor may be connected to the floating diffusion node, and the ambient light removal current source may be connected between a first node, to which the photo detection unit and the transfer transistor are connected, and the power supply.

The depth pixel may further include a photo transistor formed on the photo detection unit to control the generation of the light current in response to a photo control signal.

The depth pixel may further include a transfer control transistor connected between the gate terminal of the transfer transistor and the transfer control signal and including a gate terminal to which the selection signal is applied.

The depth pixel may further include a transfer transistor connected between the photo detection unit and a floating diffusion node and including a gate terminal to which a transfer control signal is applied. A gate terminal of the driving transistor may be connected to the floating diffusion node, and the ambient light removal current source may be connected between the power supply and the floating diffusion node.

The depth pixel may further include a refresh transistor connected between a first node, to which the photo detection unit and the transfer transistor are connected, and the power supply, and including a gate terminal to which a refresh control signal is applied.

According to example embodiments, a three-dimensional image sensor includes a light source unit and a pixel array. The light source unit irradiates a modulated transmission light to a subject. The pixel array includes a plurality of depth pixels to generate distance information between the three-dimensional image sensor and the subject based on a received light reflected from the subject. Each of the depth pixels includes a photo detection unit, an ambient light removal current source, a driving transistor and a select transistor. The photo detection unit generates a light current based on a received light. The ambient light removal current source generates an ambient light component included in the received light in response to a power supply and at least one compensation control signal. The driving transistor amplifies an effective voltage corresponding to the light current and the compensation current. The select transistor outputs the amplified effective voltage as the distance information in response to a selection signal.

The ambient light removal current source may include a first transistor connected between the power supply and the photo detection unit and including a gate terminal to which a first compensation control signal is applied.

The three-dimensional image sensor may initialize a period and an activation level of the first compensation control signal, may acquire an offset of the receive light based on the first compensation control signal having the initialized period and the initialized activation level, and may compare the acquired offset with a reference offset to determine an optimized period and an optimized activation level of the first compensation control signal.

When the acquired offset is greater than the reference offset, the three-dimensional image sensor may reduce a current period and a current activation level of the first compensation control signal, and may repeat an operation of acquiring the offset of the received light and an operation of comparing the acquired offset with the reference offset based on the first compensation control signal having the reduced period and the reduced activation level, and when the acquired offset is less than the reference offset, the three-dimensional image sensor may select a current period and a current activation level of the first compensation control signal as the optimized period and the optimized activation level of the first compensation control signal.

In the depth pixel of the three-dimensional image sensor according to example embodiments as described above, a compensation current for removing an ambient light component included in a received light is generated in response to a compensation control signal, and the compensation current is generated based on a compensation charge having a polarity opposite to a polarity of a photo charge collected by a photo detection unit. Accordingly, the depth pixel and the three-dimensional image sensor including the same can exactly measure a distance between the three-dimensional image sensor and the subject without saturating the photo detection unit.

At least one example embodiment relates to a depth pixel.

In one embodiment, the depth pixel includes a photo detector configured to generate a current based on an amount of incident light reflected onto the photo detector from a subject, the incident light including an ambient light component; and a current source configured to adjust the generated current to compensate for the ambient light component such that an output voltage indicates a distance between the depth pixel and the subject.

In one embodiment, the current source is configured to adjust the generated current by generating a compensation current in response to a compensation control signal, the compensation control signal being a pulse having a magnitude and a period, the period including an on-time during which the current source is activated, and during a light collection period, the depth pixel is configured to vary one or more of the period of the compensation signal, the on-time of the compensation signal and the magnitude of the compensation signal according to an intensity of the ambient light component.

In one embodiment, the current source is configured to generate the compensation current such that a magnitude of the compensation current varies inversely with the period of the compensation control signal and the magnitude of the compensation current varies directly with a length of the on-time of the compensation control signal.

In one embodiment, the photo detector is configured to detect the incident light in response to a photo control signal, and wherein the photo control signal and a light transmitted onto the subject both have a first phase, and the incident light reflected onto the photo detector has a second phase that is different from the first phase, and a phase difference between the first phase and the second phase indicates a time of flight for a signal to travel between the depth pixel and the subject.

In one embodiment, during a read period after the light collection period, the depth pixel is configured to, sample voltages at a floating diffusion node after transferring the adjusted current to the floating diffusion node, the floating diffusion node connected to the photo detector and the current source; determine the phase difference based on the sampled voltages; and determine the distance between the depth pixel and the subject based on the determined phase difference and a frequency of the incident light.

BRIEF DESCRIPTION OF THE DRAWINGS

Illustrative, non-limiting example embodiments will be more clearly understood from the following detailed description taken in conjunction with the accompanying drawings.

FIG. 19 is a block diagram illustrating an example of an interface employable in the computing system shown in FIG. 18 according to example embodiments.

DETAILED DESCRIPTION OF THE EMBODIMENTS

Figure 1:
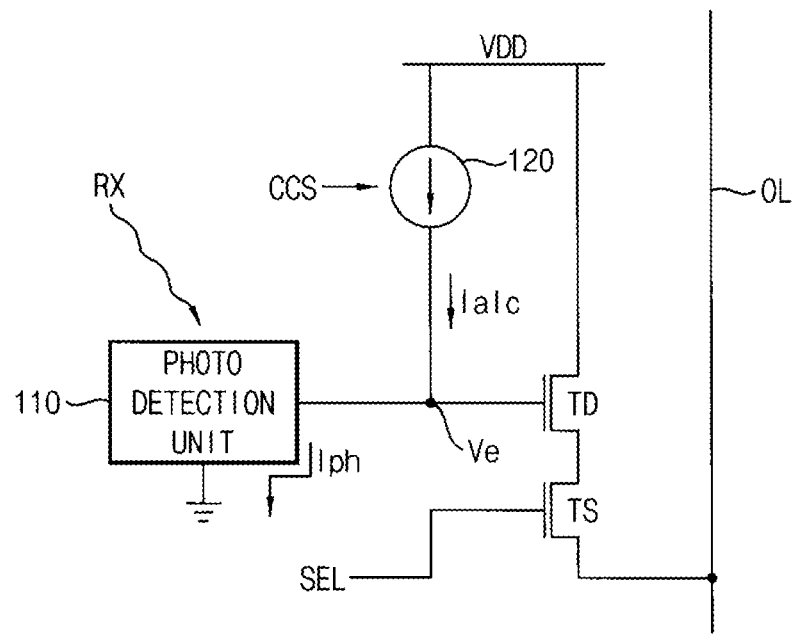
FIG. 1 is a diagram illustrating a depth pixel of a three-dimensional image sensor according to example embodiments.

Various example embodiments will be described more fully with reference to the accompanying drawings, in which embodiments are shown. These inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the inventive concepts. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concepts. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by one of ordinary skill in the art to which these inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagram illustrating a depth pixel of a three-dimensional image sensor according to example embodiments.

Referring to FIG. 1, a depth pixel 100 included in a three-dimensional image sensor includes a photo detection unit 110, an ambient light removal current source 120, a driving transistor TD, and a select transistor TS.

The photo detection unit 110 generates a light current Iph based on a received light RX. The received light RX may correspond to a light, which is emitted from a light source unit included in the three-dimensional image sensor and reflected from the subject to the three-dimensional image sensor.

The ambient light removal current source 120 generates a compensation current Ialc in response to a power supply VDD and at least one compensation control signal CCS. The compensation current Ialc is used to remove an ambient light component included in the received light RX. The ambient light removal current source 120 may be implemented with at least one transistor, and may be directly or indirectly connected with the photo detection unit 110.

The driving transistor TD amplifies an effective voltage Ve corresponding to a sum of a light current Iph and a compensation current Ialc. The select transistor TS outputs the amplified effective voltage Ve as depth information in response to a selection signal SEL. The driving transistor TD includes a gate terminal to which the effective voltage Ve is applied, and the gate terminal may be directly or indirectly connected to the ambient light removal current source 120. The select transistor TS may include a gate terminal to which the selection signal SEL is applied. The amplified effective voltage Ve is provided to an output line OL, and the output line OL may correspond to a column line of a pixel array of the three-dimensional image sensor.

Figure 2:
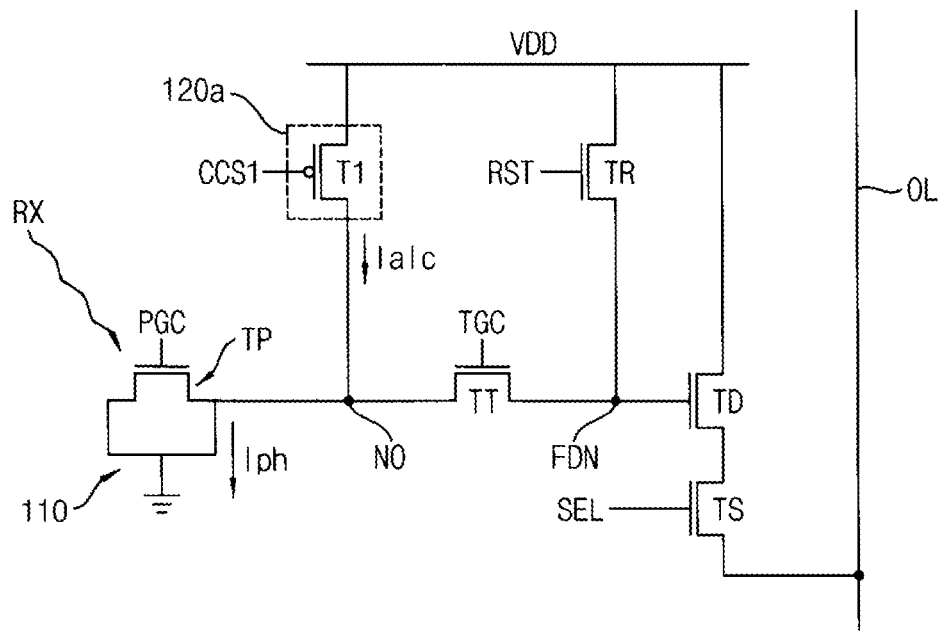
FIG. 2 illustrating an example of a circuit diagram of the depth pixel of the three-dimensional image sensor shown in FIG. 1 according to example embodiments.

FIG. 2 illustrating an example of a circuit diagram of the depth pixel of the three-dimensional image sensor shown in FIG. 1.

Referring to FIG. 2, the depth pixel 100a includes a photo detection unit 110, an ambient light removal current source 120a, a driving transistor TD, and a select transistor TS, and may further include a photo transistor TP, a transfer transistor TT, and a reset transistor TR.

The photo detection unit 110 may generate photo charges based on light RX received from outside the depth pixel 100a. The light current Iph may be generated based on the photo charges. For example, the photo detection unit 110 may include a photo diode, a pinned photo diode, and may be formed by doping a semiconductor substrate with an impurity having conductivity opposite to that of the semiconductor substrate through an ion implantation process.

The photo transistor TP (or photo gate) is formed on the photo detection unit 110, and may control the generation of the light current Iph in response to a photo control signal PGC. When the photo transistor TP is turned-on, the photo detection unit 110 may detect an incident light to generate the photo charges. In contrast, when the photo transistor TP is turned-off, the photo detection unit 110 may not detect the incident light.

The ambient light removal current source 120a may include a first transistor T1. The first transistor T1 is connected between the power supply VDD and the photo detection unit 100 (that is, first node N0), and may include a gate terminal to which a first compensation control signal CCS1 is applied. The first transistor T1 may control generation of the compensation current Ialc.

In the example embodiments, the first transistor T1 may be implemented by a type different from types of other transistors TP, TT, TR, TD, and TS. That is, the transistors TP, TT, TR, TD, and TS may include a first type transistor, and the first transistor T1 may include a second type transistor different from the first type transistor. For example, when an N type impurity is doped into a P type semiconductor substrate to form the photo detection unit 110, that is, when the photo detection unit 110 collects electrons based on the received light RX, the transistors TP, TT, TR, TD may be an NMOS transistor and the first transistor T1 may be a PMOS transistor.

According to the example embodiments, the first transistor T1 may be the NMOS transistor and the transistors TP, TT, TR, and TD may be the PMOS transistor.

The transfer transistor TT is connected between the photo detection unit 110 (that is, first node N0) and a floating diffusion node FDN, and may include a gate terminal to which a transfer control signal TGC is applied. The transfer transistor TT may transmit photo charges, which remain from among the photo charges generated by the photo detection unit 110 without being extinguished by charges introduced from the first transistor T1, to the floating diffusion node FDN in response to the transfer control signal TGC.

The reset transistor TR is connected between the power supply VDD and the floating diffusion node FDN, and may include a gate terminal to which a reset signal RST is applied. The reset transistor TR may discharge charges stored in the floating diffusion node FDN in response to a reset signal RST.

The driving transistor TD and the select transistor TS may be serially connected between the power supply VDD and an output line OL. The gate terminal of the driving transistor TD may be connected to the floating diffusion node FDN. The select transistor TS may provide a voltage VFD of the floating diffusion node FDN amplified by the driving transistor TD to the output line OL.

Figure 3:
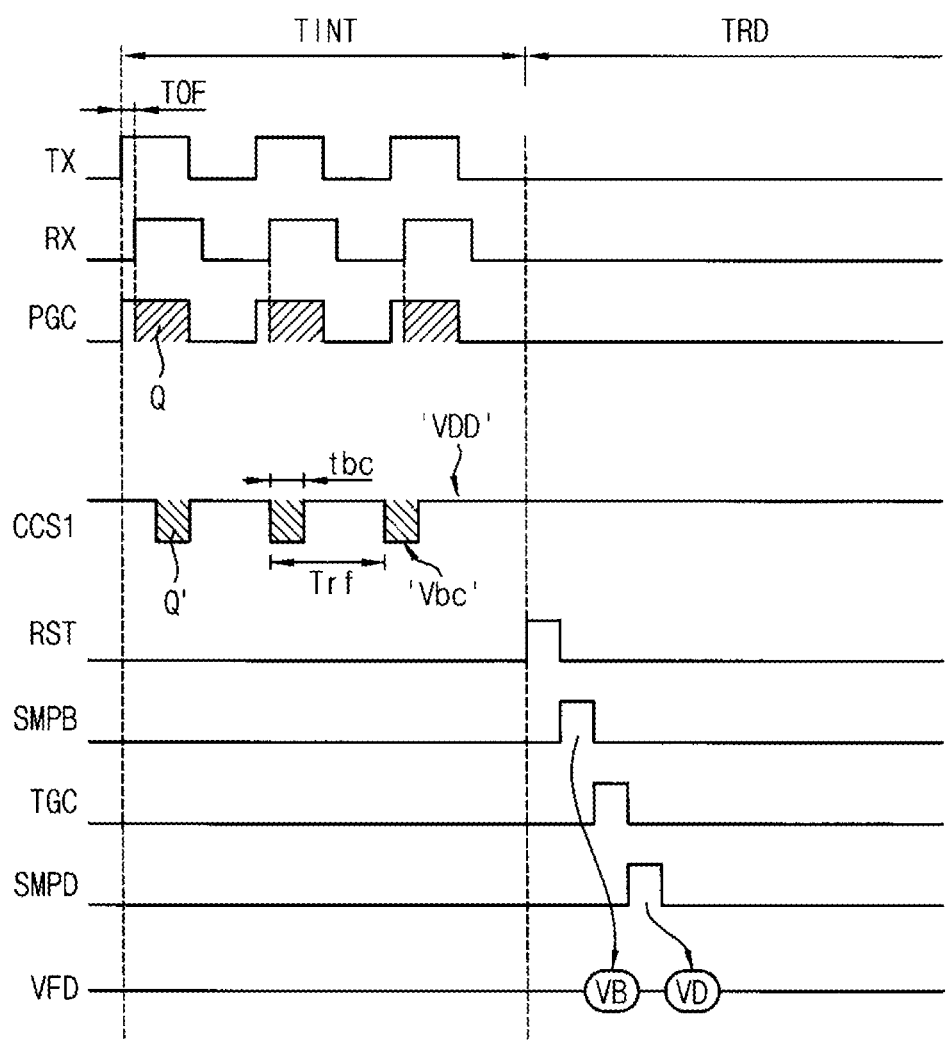
FIG. 3 is a timing chart illustrating an operation of the depth pixel shown in FIG. 2 according to example embodiments.

FIG. 3 is a timing chart illustrating an operation of the depth pixel shown in FIG. 2 according to an example embodiment.

Referring to FIGS. 2 and 3, a modulated transmission light TX irradiated onto the subject is reflected from the subject and reaches the depth pixel 100a as the received light RX during a light collection period TINT. The received light RX is delayed by a Time of Flight (TOF) as compared with the transmission light TX. The photo detection unit 110 generates photo charges according to the received light RX so that the light current Iph is generated.

The photo control signal PGC having a periodically variable intensity during the light collection period TINT has the same phase as that of the transmission light TX. The TOF may be determined by acquiring an amount of a photo charge Q corresponding to an activation period of the photo control signal PGC from among the photo charges generated by the photo detection unit 110 according to the received light RX. In this case, the first compensation control signal CCS1 is activated in a preset period Trf during the light collection period TINT. The first transistor T1 generates compensation charges (that is, holes) having a polarity opposite to polarities of the photo charges (that is, electrons) and the compensation charges are applied to the photo detection unit 110 so that the compensation current Ialc is generated during an activation period tbc of the first compensation control signal CCS1 (that is, while the first transistor T1 is turned-on). Some of collected electrons combined with the holes are extinguished, so that an ambient light component included in the received light RX is removed. For example, photo charges corresponding to an amount of the compensation charge Q' corresponding to the activation period tbc of the first compensation control signal CCS1 are extinguished from among the photo charges generated from the photo detection unit 110 according to the received light RX. According to the example embodiments, the photo charge Q and the compensation charge Q' may be stored in a temporary storage area (not shown) such as a bridge diffusion node.

A magnitude of the compensation current Ialc generated in response to the first compensation control signal CCS1 may satisfy a following Equation 1.

$$Ialc = \frac{tbc}{Trf} \cdot \mu_p C_{ox} \cdot \frac{W}{L}(VDD - Vbc - |V_{thp}|)$$ [Equation 1]

In the Equation 1, W, L, Cox, and Vthp represent a channel width, a length of the first transistor T1, capacitance and a threshold voltage level of an oxide, respectively, $\mu_p$ represents mobility of a hole, and the tbc, Trf, VDD, and Vbc represent a length of an activation period, a period, an inactivation level, and an activation level of the first compensation control signal CCS1, respectively. The activation level and the inactivation level represent voltage levels of the first compensation control signal CCS1 when the first transistor T1 is turned-on and turned-off.

As illustrated in the equation 1, the magnitude of the compensation current Ialc may be inversely proportional to the preset period Trf of the first compensation control signal CCS1 and proportional to the length of the activation period tbc of the first compensation control signal CCS1. According to the example embodiments, the preset period Trf, the activation period tbc and the magnitude Vbc of the first compensation control signal CCS1 may be changed according to an intensity of the ambient light, which will be described with reference to FIGS. 15 and 16.

If a read period TRD for measuring an amount of the collected photo charge starts, the reset signal RST is firstly activated so that the floating diffusion node FDN is reset. Next, if a first sampling control signal SMPB is activated, a voltage of the floating diffusion node FDN is detected as a noise voltage VB. After the noise voltage VB is detected, the transfer control signal TGC is activated so that remaining photo charges, which are not extinguished due to the compensation charge Q', are transmitted to the floating diffusion node FDN. After that, if a second sampling control signal SMPD is activated, a voltage VFD of the floating diffusion node FDN is detected as a demodulation voltage VD. A difference between the demodulation voltage VD and the noise voltage VB may correspond to actual distance information.

Figure 4:
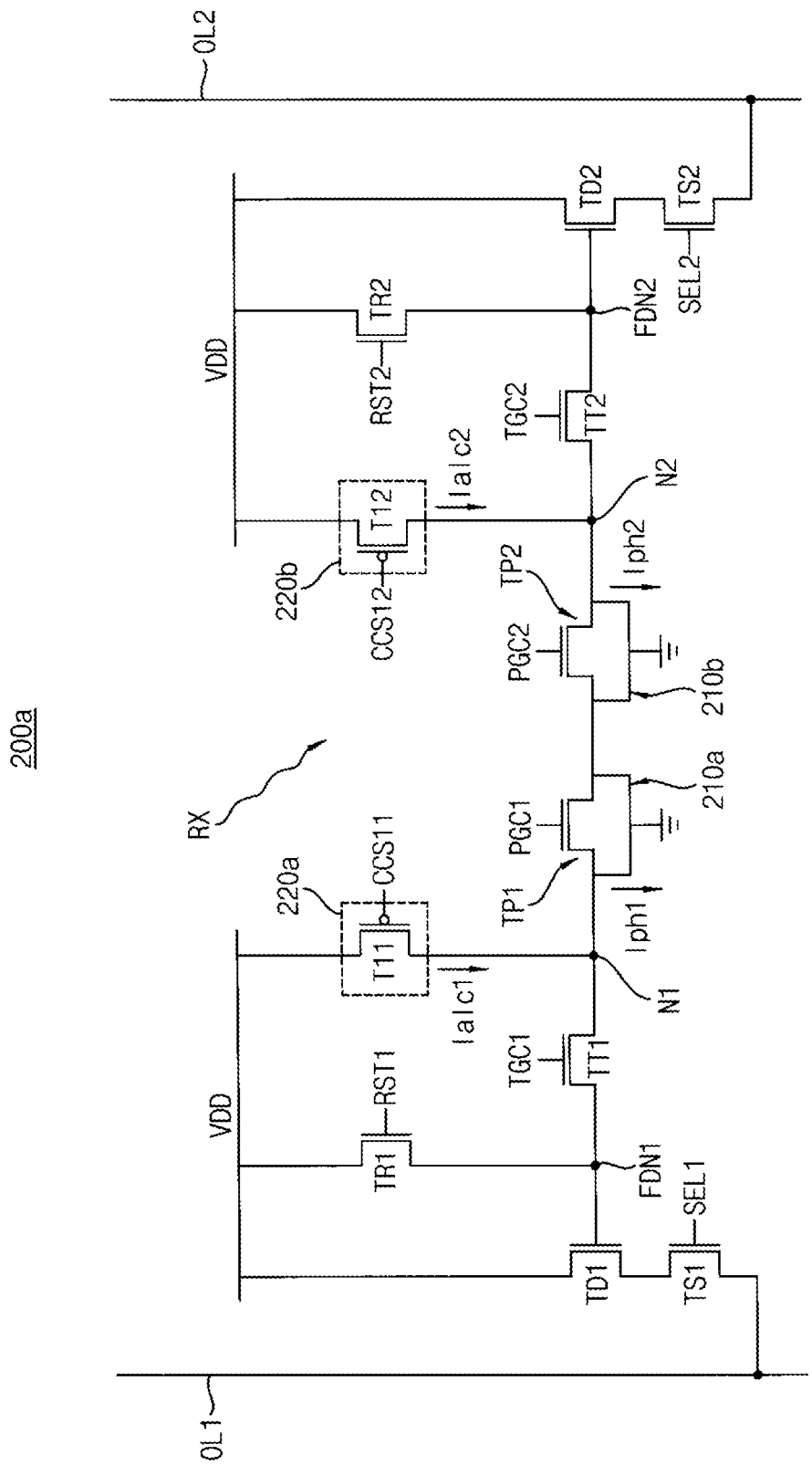
FIG. 4 is a circuit diagram illustrating another example of the depth pixel of the three-dimensional image sensor shown in FIG. 1 according to example embodiments.

FIG. 4 is a circuit diagram illustrating another example of the depth pixel of the three-dimensional image sensor shown in FIG. 1 according to an example embodiment.

Referring to FIG. 4, a depth pixel 200a may include a first half pixel and a second half pixel symmetrical to each other.

The first and second half pixels have substantially the same structure as that of the depth pixel 100a shown in FIG. 2. The first half pixel may include a first photo detection unit 210a, a first ambient light removal current source 220a, a first photo transistor TP1, a first transfer transistor TT1, a first reset transistor TR1, a first driving transistor TD1, and a first select transistor TS1. The second half pixel may include a second photo detection unit 210b, a second ambient light removal current source 220b, a second photo transistor TP2, a second transfer transistor TT2, a second reset transistor TR2, a second driving transistor TD2, and a second select transistor TS2.

The depth pixel 200a of FIG. 4 may precisely calculate the TOF by using a plurality of photo control signals PGC1 and PGC2, at least one of which having a phase different from that of the transmission light TX. For example, the depth pixel 200a may acquire distance information using the first photo control signal PGC1 having the same phase as that of the transmission light TX and the second photo control signal PGC2 having a phase (that is, a phase difference of 180°) opposite to that of the transmission light TX. Accordingly, the respective half pixels may periodically repeat a charge collecting operation during a light collection period.

Figure 5:
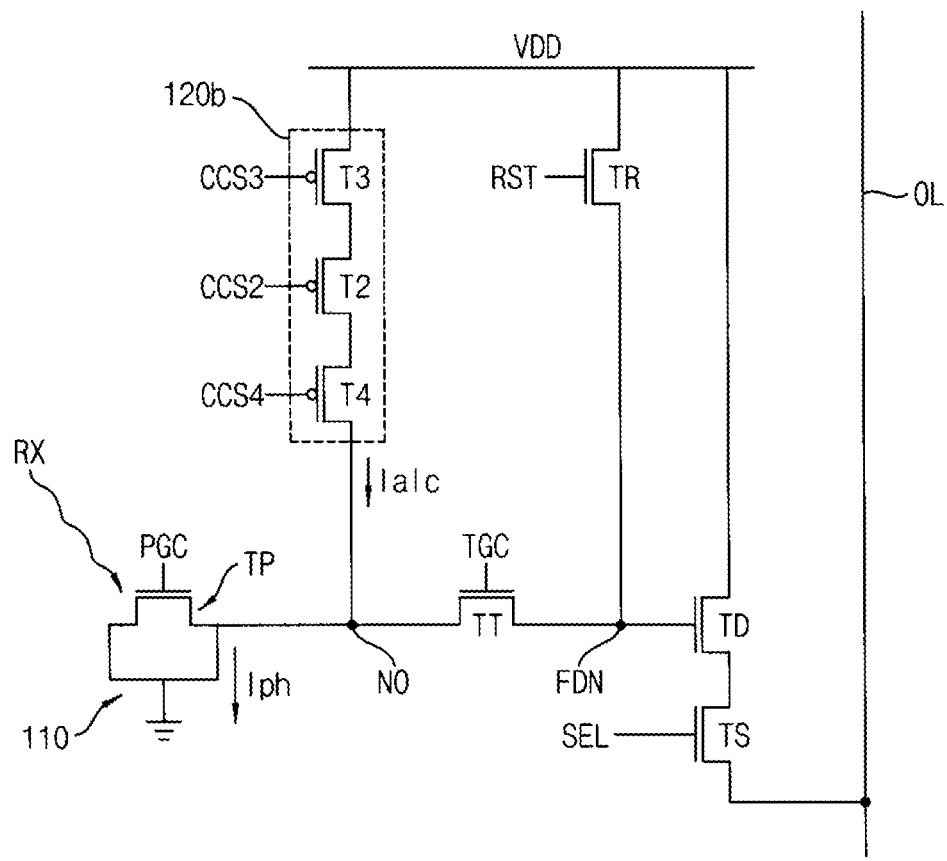
FIG. 5 is a circuit diagram illustrating an example of the depth pixel of the three-dimensional image sensor shown in FIG. 1 according to example embodiments.

FIG. 5 is a circuit diagram illustrating an example of the depth pixel of the three-dimensional image sensor shown in FIG. 1 according to an example embodiment.

The depth pixel 100b of FIG. 5 may have a same structure as the depth pixel 100a of FIG. 2 except that a structure of the ambient light removal current source 120b is changed. The ambient light removal current source 120b may include a first transistor T2, a second transistor T3, and a third transistor T4.

The first transistor T2, the second transistor T3, and the third transistor T4 may be serially connected to each other between the power supply VDD and a photo detection unit 110. For example, the first transistor T2 may be disposed at a central part of the ambient light removal current source 120b, the second transistor T3 may be connected between the power supply VDD and the first transistor T2, and the third transistor T4 may be connected between the second transistor T3 and the photo detection unit 110 (that is, first node N0). The first to third transistors T2, T3, and T4 may include gate terminals to which a first compensation control signal CCS2, a second compensation control signal CCS3, and a third compensation control signal CCS4 are applied, respectively.

In the example embodiments, the first to third transistors T2, T3, and T4 may be implemented with a type different from types of other transistors TP, TT, TR, TD, and TS. For example, the transistors TP, TT, TR, TD, and TS may be an NMOS transistor, and the transistors T2, T3, and T4 may be a PMOS transistor.

Figure 6:
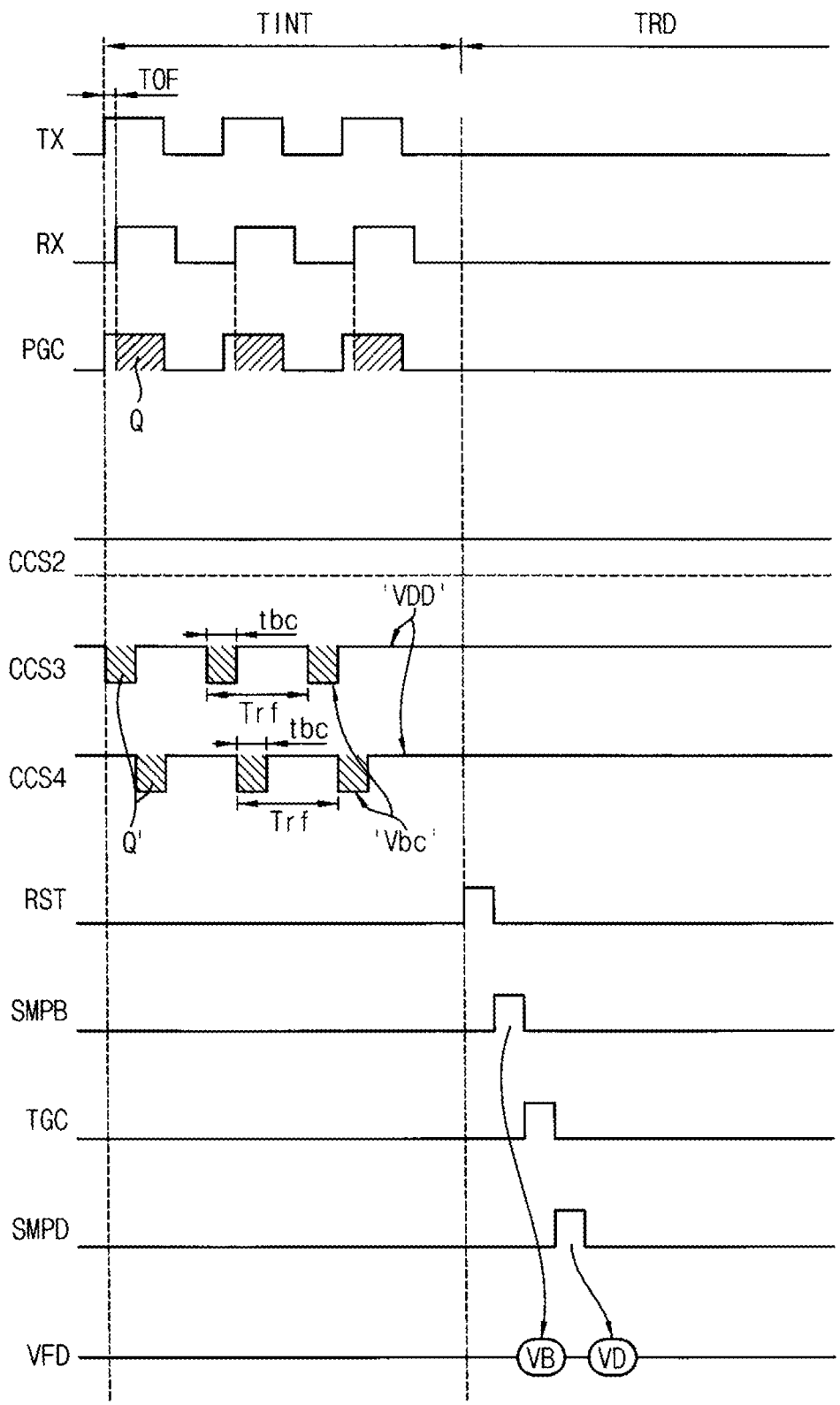
FIG. 6 is a timing chart illustrating an operation of the depth pixel shown in FIG. 5.

FIG. 6 is a timing chart illustrating an operation of the depth pixel shown in FIG. 5 according to an example embodiment.

Referring to FIGS. 5 and 6, a first compensation control signal CCS2 maintains an activation state during the light collection period TINT. Second and third compensation control signals CCS3 and CCS4 may be activated in a preset period Trf and be sequentially activated. For example, the second compensation control signal CCS3 may be firstly activated and then the third compensation control signal CCS5 may be activated. Each period of the second and third compensation control signals CCS3 and CCS4 may be substantially the same as a length of the activation period tbc. Compensation charges having a polarity opposite to those of photo charges are generated during the activation period tbc of the second compensation control signal CCS3. The compensation charges are applied to the photo detection unit 110 so that the compensation current Ialc is generated during the activation period tbc of the third compensation control signal CCS4. In this case, the magnitude of the compensation current Ialc is inversely proportional to the period of the second and third compensation control signals CCS3 and CCS4 and proportional to the length of the activation period tbc of the second and third compensation control signals CCS3 and CCS4, and the period Trf and the activation level Vbc of the second and third compensation control signals CCS3 and CCS4 may be changed according to an intensity of the ambient light. Photo charges corresponding to an amount of the compensation charge Q' corresponding to the activation period tbc of the second and third compensation control signal CCS3 and CCS4 are extinguished from among the photo charges so that the ambient light component included in the received light RX is removed.

The depth pixel 100a of FIG. 2 turns-on/off the transistor T1 serving as a current source based on a control signal CCS1. In contrast, in the depth pixel 100b of FIG. 5, the second transistor T2 serving as the current source is always in a turning-on state, and two transistors T3 and T4 which are sequentially turned-on are disposed at both sides of the current source, so the compensation current Ialc may be efficiently generated.

Figure 7:
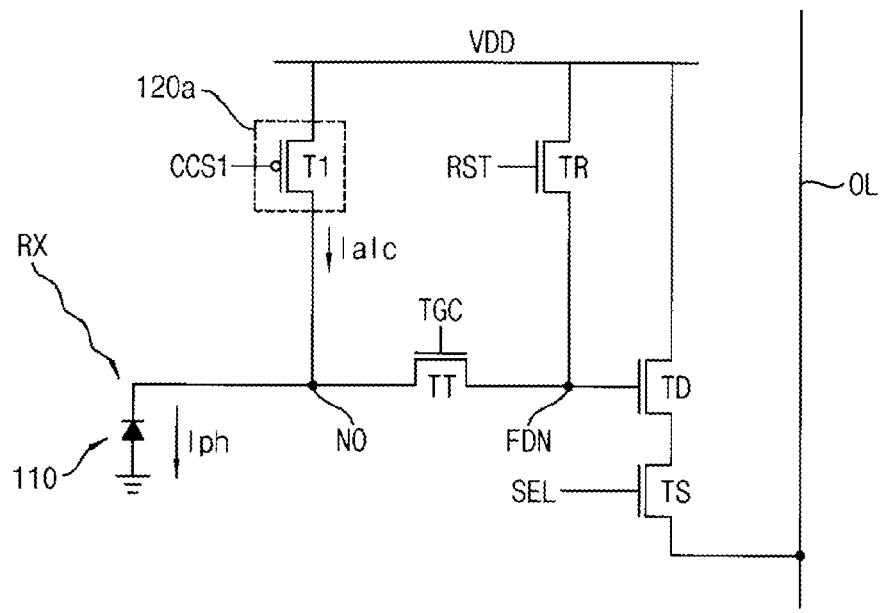
FIGS. 7 and 8 are circuit diagrams illustrating other examples of the depth pixel of the three-dimensional image sensor shown in FIG. 1 according to example embodiments.
Figure 8:
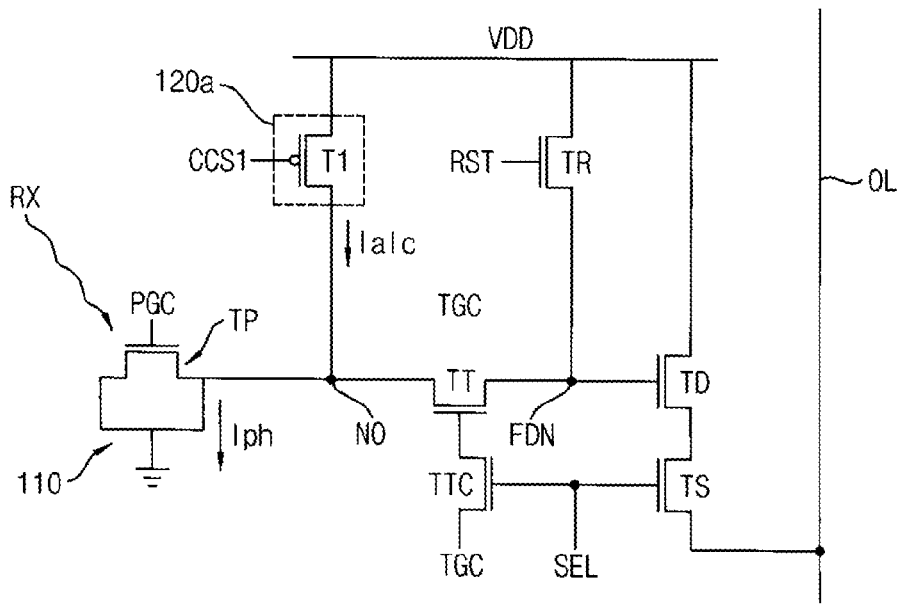

FIGS. 7 and 8 are circuit diagrams illustrating other examples of the depth pixel of the three-dimensional image sensor shown in FIG. 1 according to an example embodiment.

The depth pixel 100c of FIG. 7 may have a same structure as the depth pixel 100a of FIG. 2 except that the photo transistor is omitted. In this case, the transfer control signal TGC has a periodically variable intensity during the light collection period TINT like the photo control signal PGC of FIG. 3, and the transfer transistor TT may control generation of the light current Iph in response to the transfer control signal TGC.

The depth pixel 100d of FIG. 8 may be equal to the depth pixel 100a of FIG. 2 except that the transfer control transistor TTC is further included therein. The transfer control transistor TTC is connected between a gate terminal of the transfer transistor TT and the transfer control signal TGC, and may include a gate terminal to which a selection signal SEL is applied. The transfer control transistor TTC may selectively apply the transfer control signal TGC to the transfer transistor TT in response to a selection signal SEL.

According to the example embodiments, the ambient light removal current source 120a shown in FIGS. 7 and 8 may be replaced with the ambient light removal current source 120b shown in FIG. 5.

Figure 9:
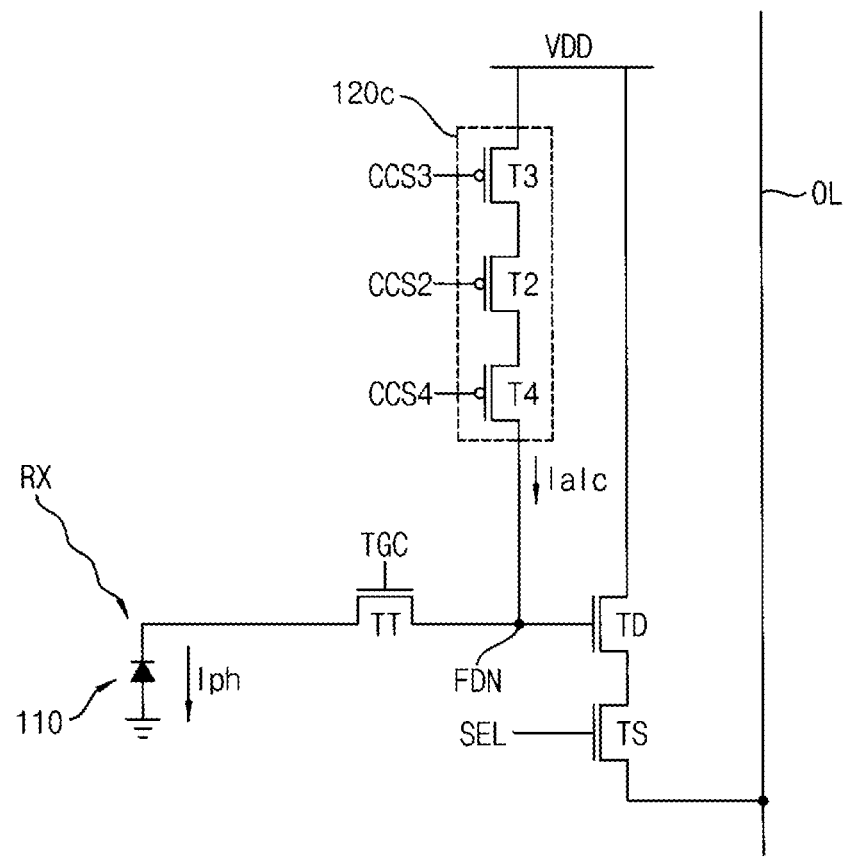
FIG. 9 is a circuit diagram illustrating another example of the depth pixel of the three-dimensional image sensor shown in FIG. 1 according to example embodiments.

FIG. 9 is a circuit diagram illustrating another example of the depth pixel of the three-dimensional image sensor shown in FIG. 1 according to an example embodiment.

Referring to FIG. 9, the depth pixel 100e includes a photo detection unit 110, an ambient light removal current source 120c, a driving transistor TD, and a select transistor TS, and may further include a transfer transistor TT.

In an example embodiment of FIG. 9, the ambient light removal current source 120c may remove an ambient light component and resets a floating diffusion node FDN. The ambient light removal current source 120c is connected between the power supply VDD and the floating diffusion node FDN, and may include a first transistor T2, a second transistor T3, and a third transistor T4. The transistors T2, T3, and T4 may be serially connected to each other between the power supply VDD and the floating diffusion node FDN. For example, the first transistor T2 may be disposed at a central part of the ambient light removal current source 120c, the second transistor T3 may be connected between the power supply VDD and the first transistor T2, and the third transistor T4 may be connected between the second transistor T3 and the floating diffusion node FDN. The first to third transistors T2, T3, and T4 may include gate terminals to which a first compensation control signal CCS2, a second compensation control signal CCS3, and a third compensation control signal CCS4 are applied, respectively. The transistors T2, T3, and T4 may be implemented by a type different from types of transistors TT, TD, and TS.

Figure 10:
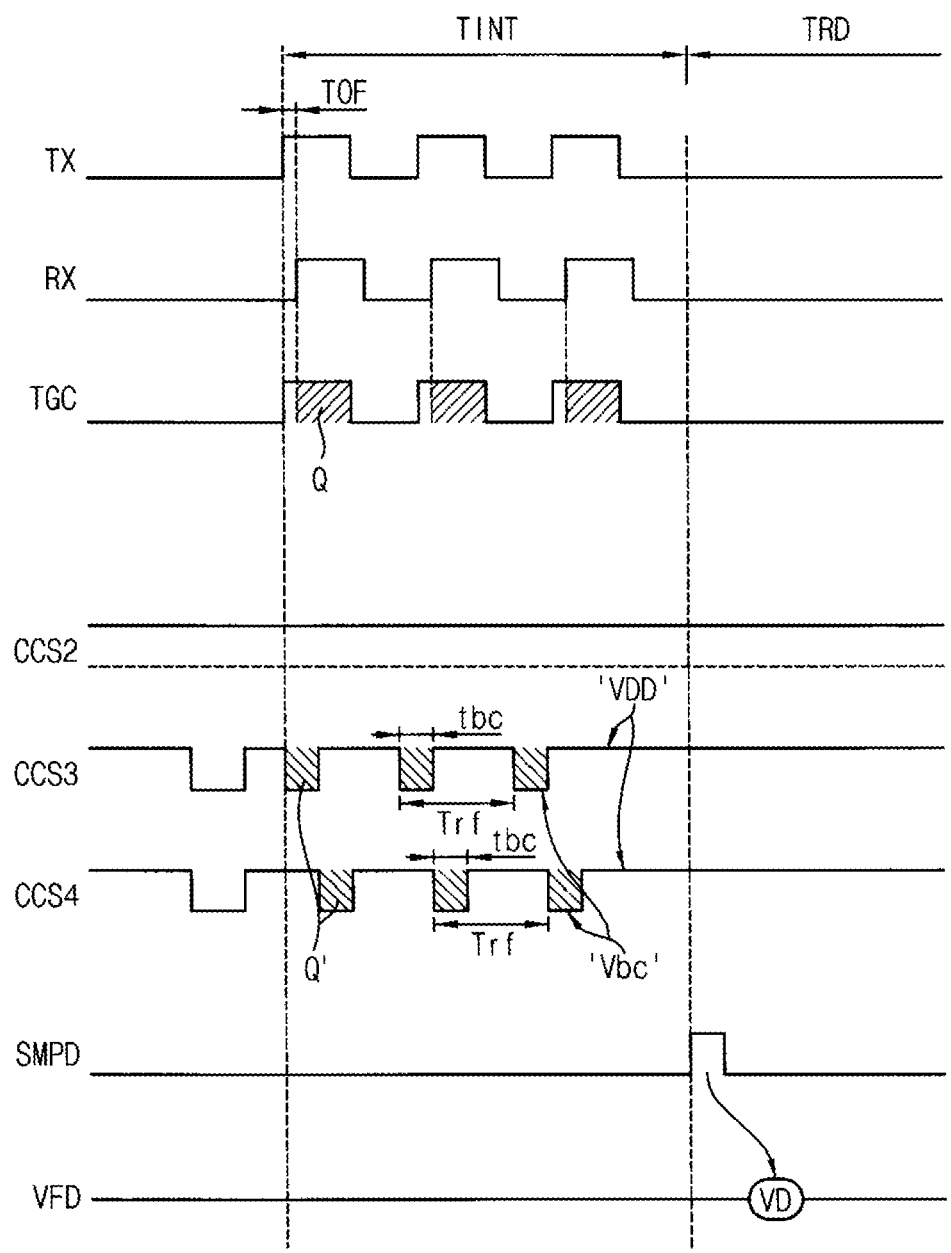
FIG. 10 is a timing chart illustrating an operation of the depth pixel shown in FIG. 9.

FIG. 10 is a timing chart illustrating an operation of the depth pixel shown in FIG. 9 according to an example embodiment.

Referring to FIGS. 9 and 10, the compensation control signals CCS2, CCS3, and CCS4 are all activated before the light collection period TINT so that the floating diffusion node FDN is reset. A transmission light TX irradiated to the subject is reflected from the subject during the light collection period TINT and reaches the depth pixel 100e as a received light RX. Photo charges are generated from the photo detection unit 110 based on the received light RX. A photo charge Q1 corresponding to an activation period of the transfer control signal TGC is stored in the floating diffusion node FDN in response to the transfer control signal TGC which periodically varies during the light collection period TINT and has the same phase as that of the transmission light TX. A first compensation control signal CCS2 maintains an activation state during the light collection period TINT. Second and third compensation control signals CCS3 and CCS4 may be sequentially activated in a preset period Trf. Compensation charges having polarity opposite to that of photo charges are generated during the activation period tbc of the second compensation control signal CCS3. The compensation charges are applied to the floating diffusion node FDN so that the compensation current Ialc is generated during an activation period tbc of the third compensation control signal CCS4. Accordingly, the ambient light component included in the received light RX is removed.

Figure 11:
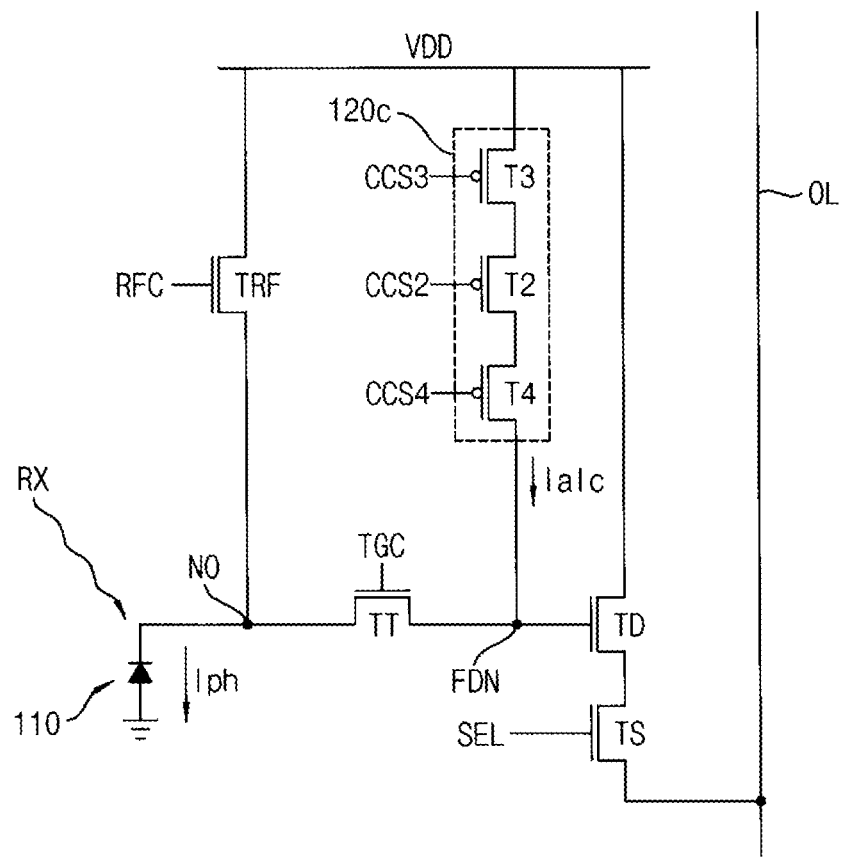
FIGS. 11 and 12 are circuit diagrams illustrating other examples of the depth pixel of the three-dimensional image sensor shown in FIG. 1 according to example embodiments.
Figure 12:
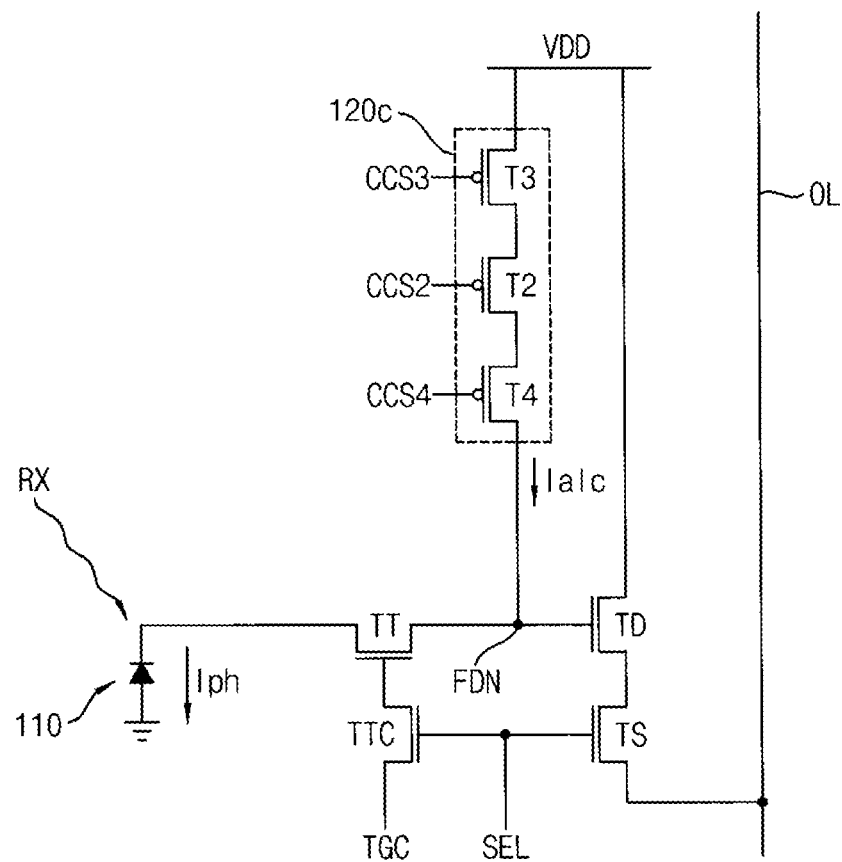

FIGS. 11 and 12 are circuit diagrams illustrating other examples of the depth pixel of the three-dimensional image sensor shown in FIG. 1 according to an example embodiment.

The depth pixel 100f of FIG. 11 may be equal to the depth pixel 100a of FIG. 2 except that a refresh transistor TRF is further included therein. The refresh transistor TRF is connected between the power supply VDD and the photo detection unit 110, that is, between the power supply VDD and a first node NO, and may include a gate terminal to which a refresh control signal RFC is applied. The refresh transistor TRF may discharge a photo charge generated from the photo detection unit 110 to the power supply VDD from the first node NO in response to the refresh control signal RFC. For example, when an ambient light is relatively strong, the refresh transistor TRF is selectively turned-on so that some of photo charges generated from the photo detection unit 110 may be discharged to the power supply VDD at least once. When the ambient light is relatively weak, the refresh transistor TRF is continuously turned-off so that the discharge of the photo charges to the power supply VDD may be blocked.

The depth pixel 100g of FIG. 12 may have a same structure as the depth pixel 100a of FIG. 2 except that the transfer control transistor TTC is further included therein.

According to the example embodiments, the ambient light removal current source 120c shown in FIGS. 9, 11, and 12 may be replaced with the ambient light removal current source 120a having the same configuration as that shown in FIG. 2. Meanwhile, a depth pixel according to the example embodiments may be implemented with a first half pixel and a second half pixel symmetrical to each other as illustrated in FIG. 4. In this case, one half pixel may correspond to depth pixels shown in FIGS. 5, 7, 8, 9, 11, and 12.

As described above, the ambient light removal current source included in the depth pixel according to the example embodiments may be directly connected to the photo detection unit 110 as shown in FIGS. 2, 5, 7, and 8 or indirectly connected to the photo detection unit 110 (that is, the floating diffusion node FDN). The gate terminal of the driving transistor TD may be directly (FIGS. 2, 5, 7, and 8) or indirectly (FIGS. 9, 11, and 12) connected to the ambient light removal current source according to a construction of the ambient light removal current source.

Figure 13:
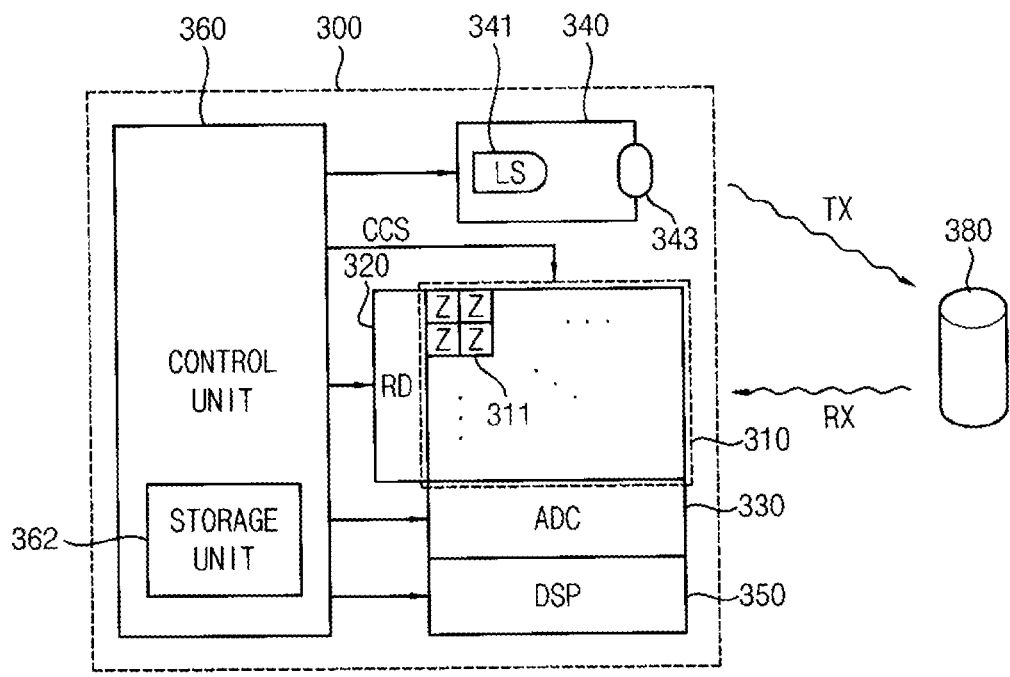
FIG. 13 is a block diagram illustrating a three-dimensional image sensor according to example embodiments.

FIG. 13 is a block diagram illustrating a three-dimensional image sensor according to example embodiments.

Referring to FIG. 13, a three-dimensional image sensor 300 may include a pixel array 310 and a light source unit 340, and may further include a row driver (RD) 320, an analog-to-digital converter (ADC) 330, a digital signal processor (DSP) 350, and a control unit 360.

The light source unit 340 may output a modulated transmission light TX (e.g., infrared light or near infrared light) having a predetermined wavelength, and irradiate the modulated transmission light TX to a subject 380. The light source unit 340 may include a light source 341 and a lens 343. For example, the light source 341 may output the modulated transmission light TX such as a sine wave where intensity periodically varies. The lens 343 may concentrate the transmission light TX onto the subject 380.

The pixel array 310 may include a plurality of depth pixels 311. The pixel array 310 may generate distance information between the three-dimensional image sensor and the subject 380 based on the received light RX reflected from the subject 380. For example, the received light RX may be generated based on an infrared light or a near infrared light TX and/or an infrared light, a near infrared light, and a visible light.

Each of the depth pixels 311 may be the depth pixel 100 of FIG. 1, and may be implemented by one of the depth pixels 100a, 200a, 100b, 100c, 100d, 100e, 100f, and 100g shown in FIGS. 2, 4, 5, 7, 8, 9, 11, and 12. That is, each of the depth pixels 311 includes an ambient light removal current source for generating a compensation current Ialc to remove an ambient light component included in the received light RX in response to at least one compensation control signal CCS, to accurately measure a distance to the subject when an ambient light is relatively strong.

According to the example embodiments, the pixel array 310 may further include a plurality of color pixels (not shown) for providing color image information. In this case, the three-dimensional image sensor 300 may include a three-dimensional for simultaneously provide the color image information and the depth information.

The row driver 320 is connected to each row of the pixel array 310, and may generate a driving signal for driving each row. The ADC 330 is connected to each column of the pixel array 310, and may convert an analog signal output from the pixel array 310 into a digital signal. According to the example embodiments, the ADC 330 may include a correlation dual sampling (CDS) unit (not shown) for extracting an effective signal component. The CDS unit may perform an analog double sampling, a digital double sampling, or a dual correlation double sampling including analog and digital double samplings.

The DSP 350 may receive a digital signal output from the ADC 330 to process image data with respect to the digital signal. The control unit 360 may supply control signals for controlling the row driver 320, the ADC 330, the light source unit 340, and the DSP 350, and provide at least one compensation control signal CCS.

In the example embodiments, the control unit 360 may include a storage unit 362. As described later with reference to FIGS. 15 and 16, the three-dimensional image sensor 300 may vary and optimize a period Trf and an activation level Vbc of at least one compensation control signal CCS. The storage unit 362 may store a period, an activation level, and a reference value (e.g., reference offset, a reference period, and a reference level) associated with the at least one compensation control signal CCS. For example, the storage unit 362 may include a volatile memory device such as dynamic random access memory (DRAM) and static random access memory (SRAM) and/or a non-volatile memory device such as a flash memory device, parameter random access memory (PRAM), ferroelectric random access memory (FRAM), resistive random access memory (RRAM), and magneto-resistive random access memory (MRAM). According to the example embodiments, the storage unit 362 may be disposed outside the control unit 360 or outside the three-dimensional image sensor 300.

Figure 14:
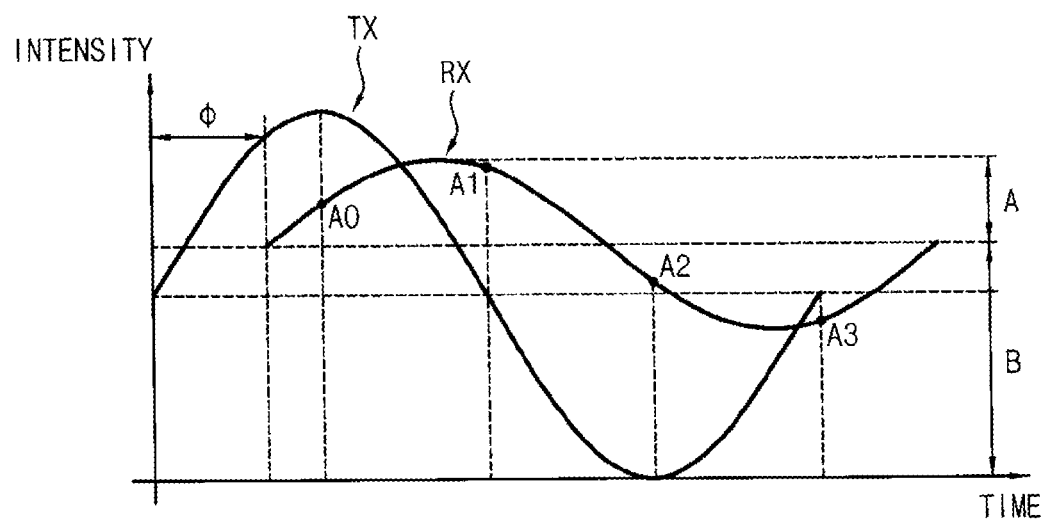
FIG. 14 is a diagram illustrating an operation of calculating a distance between the three-dimensional image sensor shown in FIG. 13 and a subject according to example embodiments.

FIG. 14 is a diagram illustrating an operation of calculating a distance between the three-dimensional image sensor shown in FIG. 13 and a subject by the three-dimensional image sensor according to an example embodiment.

Referring to FIGS. 13 and 14, the transmission light TX emitted from the light source unit 340 may have a periodically variable intensity. For example, the intensity of the transmission light TX (that is, the number of photons per unit area) may have a form of a sine wave.

The transmission light TX is reflected from the subject 380 and is incident into the pixel array 310 as the received light RX. The pixel array 310 may periodically sample the received light RX. For example, the pixel array 310 may sample the received light RX at phases of 90°, 180°, 270°, and 360° of the transmission light TX in every period of the transmission light TX to extract sampling values A0, A1, A2, and A3.

The receiving light RX may have an offset B different from an offset of the transmission light TX according to additional ambient light and noise. The offset B of the received light RX may be calculated by a following Equation 2.

$$B = \frac{A0 + A1 + A2 + A3}{4} \quad \text{[Equation 2]}$$

The received light RX may have amplitude A smaller than amplitude of the transmission light TX according to light loss. The amplitude of the received light RX may be calculated by a following Equation 3.

$$A = \frac{\sqrt{(A0 - A2)^2 + (A1 - A3)^2}}{2} \quad \text{[Equation 3]}$$

Depth information, that is, a three-dimensional image with respect to the subject 380 may be provided based on the amplitude of the received light RX with respect to the depth pixels 311 included in the pixel array 310.

The received light RX is delayed with respect to the transmission light TX by a phase difference $\phi$ corresponding to twice of a distance between the three-dimensional image sensor 300 and the subject 380. The phase difference $\phi$ of the received light RX with respect to the transmission light TX may be calculated by a following Equation 4.

$$\phi = \arctan\left(\frac{A0 - A2}{A1 - A3}\right) \quad \text{[Equation 4]}$$

The phase difference $\phi$ of the received light RX with respect to the transmission light TX corresponds to a TOF of light. The distance between the three-dimensional image sensor 300 and the subject 380 may be calculated by an Equation "R=c*TOF/2" (where, R represents a distance between the three-dimensional image sensor 300 and the subject 380, and c represents speed of light). Further, the distance between the three-dimensional image sensor 300 and the subject 380 may be calculated by a following Equation 5 using the phase $\phi$ of the received light RX.

$$R = \frac{c}{4\pi f}\phi \quad \text{[Equation 5]}$$

In the Equation 5, f represents a modulation frequency, that is, a frequency of the transmission light TX (or a frequency of the received light RX).

As described above, the three-dimensional image sensor 300 according to the example embodiments may acquire distance information with respect to the subject 380 using the transmission light TX emitted from the light source unit 340.

Figure 15:
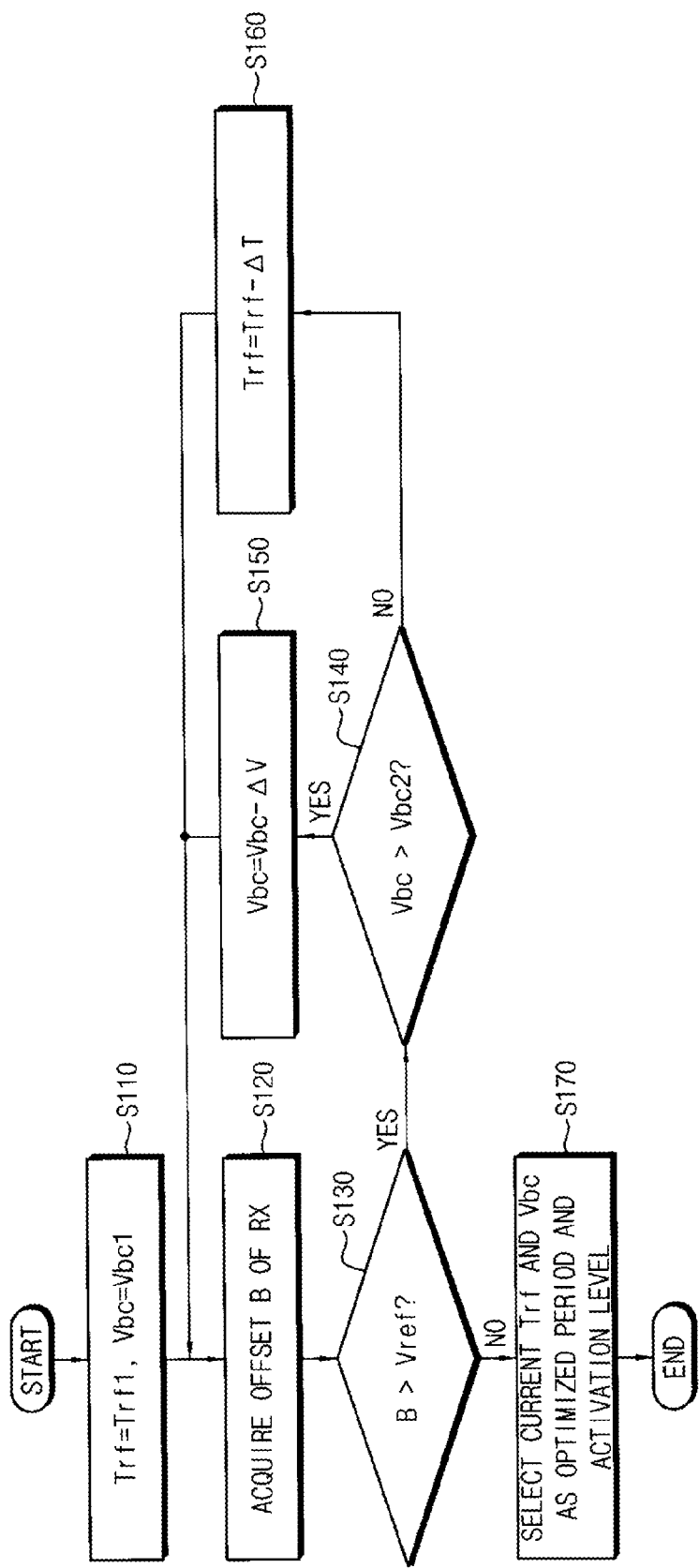
FIGS. 15 and 16 are flowcharts illustrating an operation of determining a period and an activation level of a compensation control signal in the three-dimensional image sensor shown in FIG. 13 according to example embodiments.
Figure 16:
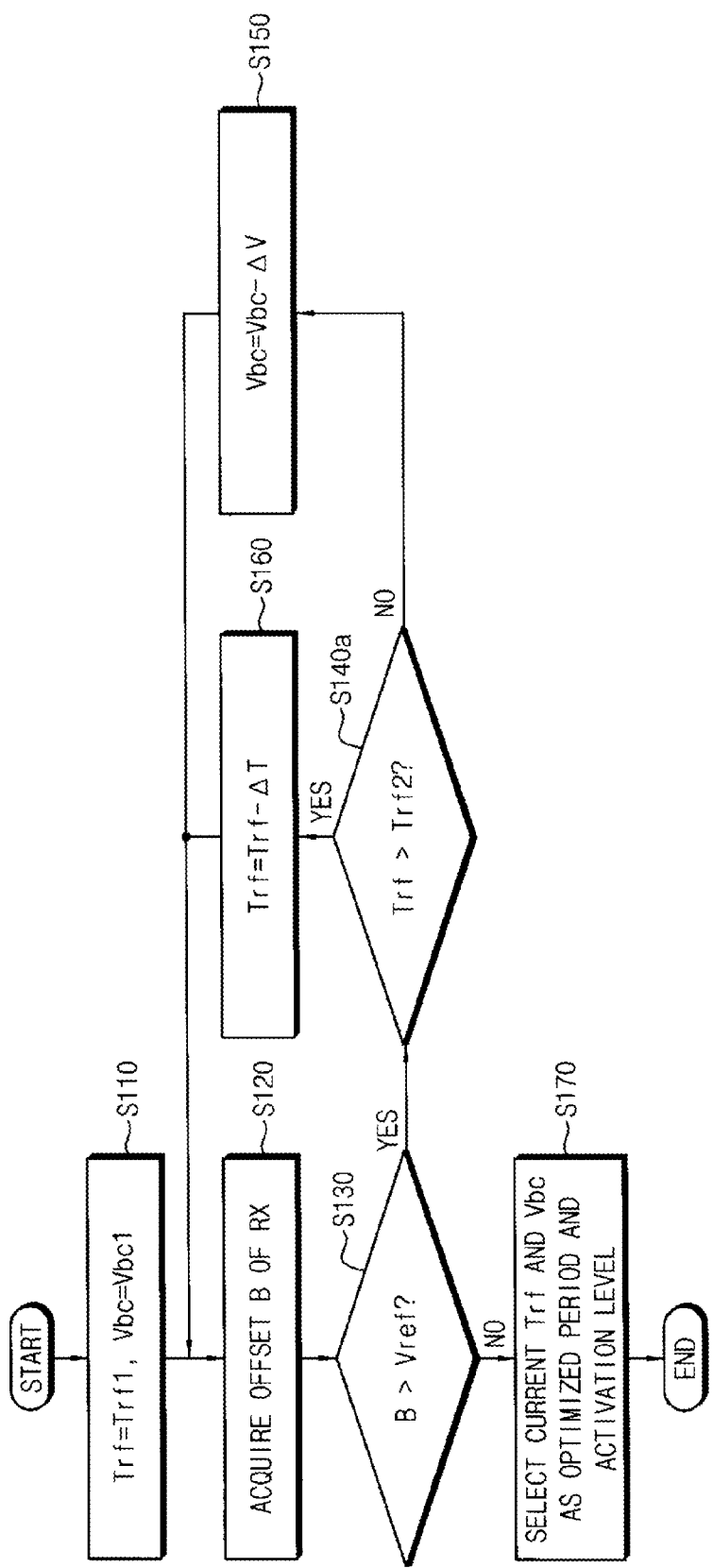

FIGS. 15 and 16 are flowcharts illustrating an operation of determining a period and an activation level of a compensation control signal in the three-dimensional image sensor shown in FIG. 13 according to an example embodiment.

Referring to FIGS. 13 and 15, the three-dimensional image sensor may initialize a period Trf and an activation level Vbc of a compensation control signal CCS to determine the period Trf and the activation level Vbc of the compensation control signal CCS (S110). For example, the period Trf of the compensation control signal CCS may be initialized as a first period Trf1 corresponding to a maximum period and the activation level Vbc of the compensation control signal CCS may be initialized as a first level Vbc1 corresponding to a maximum activation level.

The three-dimensional image sensor may acquire an offset B of the received light RX based on the compensation control signal CCS having the initialized period (that is, first period Trf1) and the initialized activation level (that is, first level Vbc1) (step S120). For example, an offset B of the received light RX may be acquired based on the sampling operation with reference to FIGS. 3, 6, and 10 and the foregoing Equation 2 with reference to FIG. 14.

The acquired offset B may be compared with a reference offset Vref to determine the optimized period and the optimized activation level of the compensation control signal CCS. For example, the reference offset Vref may be defined as "x*Vsat" (where, x represents a real number of 0 to 1, and Vsat represents a pixel saturation voltage).

In detail, when the acquired offset B is greater than the reference offset Vref (Yes of S130), the period Trf or the activation level Vbc of the compensation control signal CCS may be changed. When the activation level Vbc of the compensation control signal CCS is greater than a second level Vbc2 (Yes of step S140), the activation level Vbc of the compensation control signal CCS may be reduced from a current activation level by ΔV. When the activation level Vbc of the compensation control signal CCS is less than or equal to the second level Vbc2 (No of step S140), the period Trf of the compensation control signal CCS may be reduced from a current period by ΔT (step S160). When the activation level Vbc of the compensation control signal CCS is greater than the second level Vbc2 (Yes of step S140), the activation level Vbc may be reduced by ΔV (step S150).

In the example embodiment of FIG. 15, a priority with respect to the change may be assigned to the activation level Vbc as compared with the period Trf. A step of acquiring the offset (step S120) and a step of comparing the acquired offset B with the reference offset Vref (step S130) may repeat based on the compensation control signal CCS having the changed (that is, reduced) period and the changed (that is, reduced) activation level.

When the acquired offset B is less than or equal to the reference offset Vref (No of step S130), a current period and a current activation level of the compensation control signal CCS may be selected as the optimized period and the optimized activation level of the compensation control signal CCS, respectively (step S170).

Referring to FIGS. 13 and 16, steps S110, S120, S130, and S170 may be equal to steps S110, S120, S130, and S170 of FIG. 15.

As illustrated in FIG. 16, when the period Trf of the compensation control signal CCS is greater than the second period Trf2 (Yes of step S140), the period Trf of the compensation control signal CCS may be reduced from a current period by ΔT (step S160). When the period Trf of the compensation control signal CCS is less than or equal to the second period Trf2 (No of step S140), the activation level Vbc of the compensation control signal CCS may be reduced from a current period by ΔT (step S150). In the example embodiment of FIG. 16, a priority with respect to the change may be assigned to the period Trf as compared with the activation level Vbc.

The period Trf and the activation level Vbc of the compensation control signal CCS may be simultaneously changed.

Figure 17:
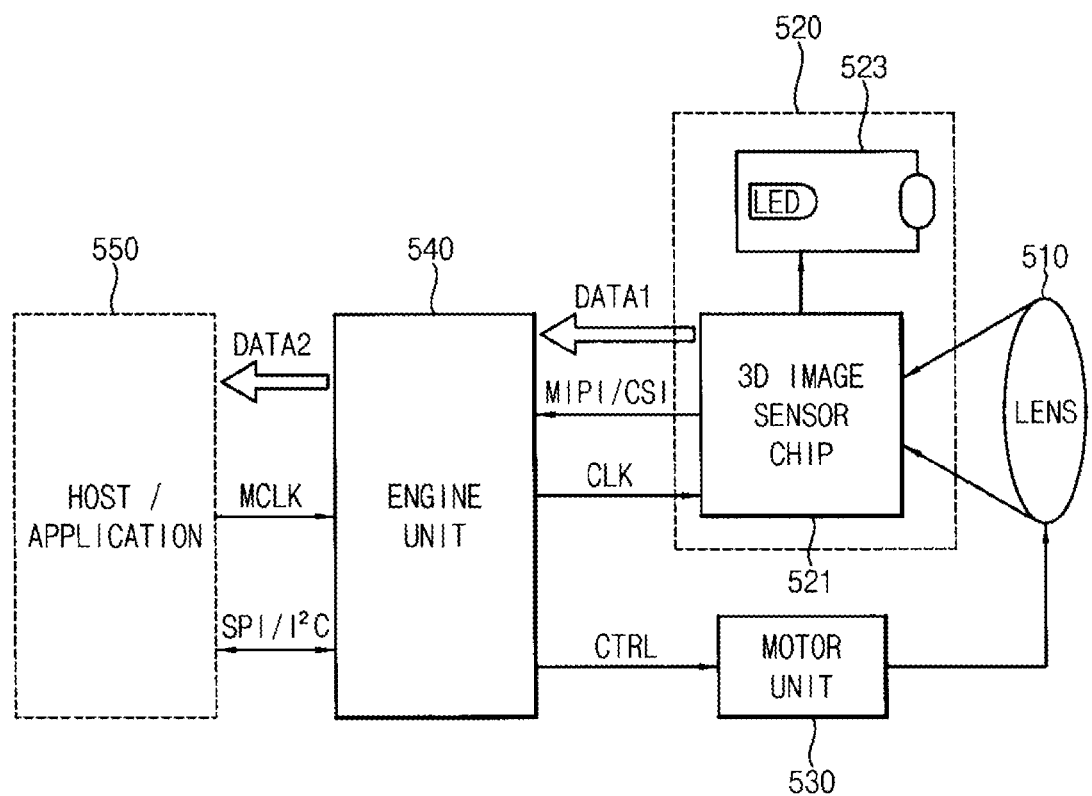
FIG. 17 is a block diagram illustrating an example of a camera including a three-dimensional image sensor according to example embodiments.

FIG. 17 is a block diagram illustrating an example of a camera including a three-dimensional image sensor according to example embodiments.

Referring to FIG. 17, the camera 500 includes a photo-receiving lens 510, a three-dimensional image sensor 520, a motor unit 530, and an engine unit 540. The three-dimensional image sensor 520 may be the three-dimensional image sensor of FIG. 13, and may include a three-dimensional image sensor chip 521 and a light source module 523.

The photo-receiving lens 510 may focus incident light on a photo-receiving region (e.g., depth pixels) of the three-dimensional image sensor chip 521. The three-dimensional image sensor chip 521 may generate data DATA1 including depth information based on the incident visible light or infrared light passing through the photo-receiving lens 510. The three-dimensional image sensor chip 521 may provide the data DATA1 to the engine unit 540 based on a clock signal CLK.

The motor unit 530 may adjust focus of the photo-receiving lens 510 or perform shuttering in response to a control signal CTRL. The engine unit 540 controls the three-dimensional image sensor 520 and the motor unit 530, and provides data DATA2 to the host/application 850 based on a master clock MCLK.

Figure 18:
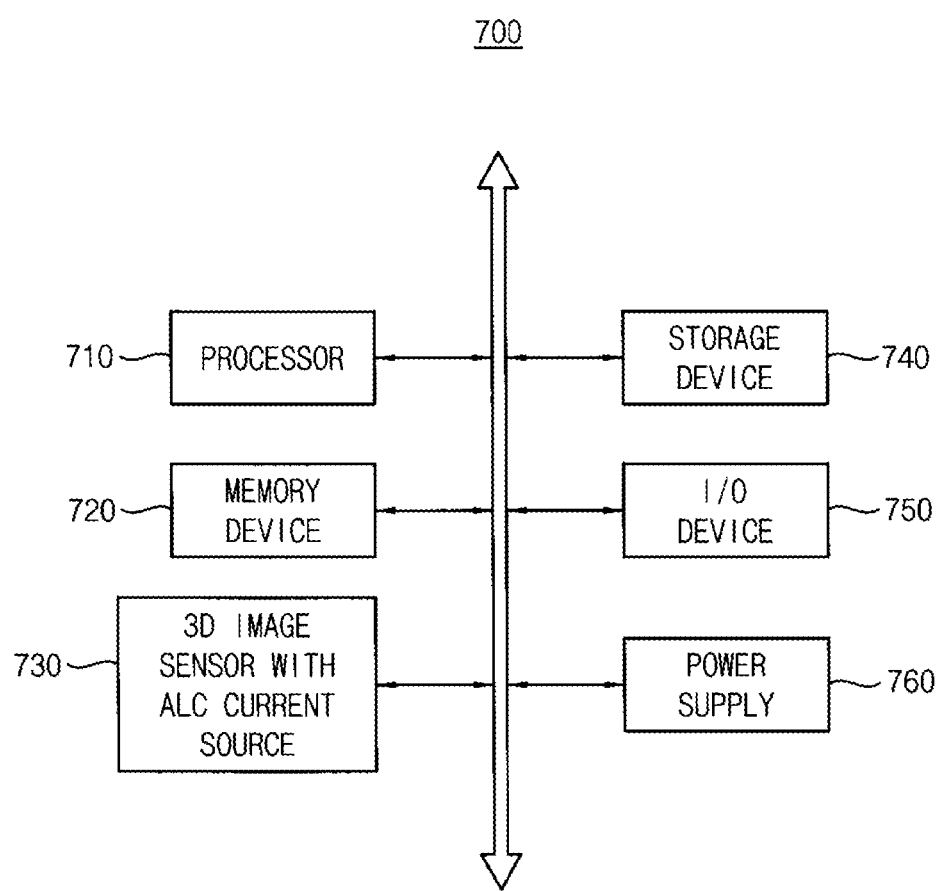
FIG. 18 is a block diagram illustrating an example of a computing system including the three-dimensional image sensor according to example embodiments.

FIG. 18 is a block diagram illustrating an example of a computing system including the three-dimensional image sensor according to example embodiments.

Referring to FIG. 18, a computing system 700 may include a processor 710, a memory device 720, a storage device 740, an input/output device 750, and a power supply 760.

The processor 710 may perform various calculations or tasks. According to example embodiments, the processor 710 may be a microprocessor or a CPU.

The memory device 720 may store data for operating the computing system 700. For example, the memory device 720 may include a volatile memory device such as DRAM and SRAM and a non-volatile memory device such as a flash memory device, PRAM, FRAM, RRAM, and MRAM.

The storage device 740 may include a solid state drive (SSD), a hard disk drive (HDD), a CD-ROM, etc. The input/output device 750 may include an input device (e.g., a keyboard, a keypad, a mouse, etc.) and an output device (e.g., a printer, a display device, etc.). The power supply 760 supplies operation voltages for the computing system 700.

The three-dimensional image sensor 730 may be connected to the processor to communicate with the processor 710. The three-dimensional image sensor 730 may be a three-dimensional image sensor of FIG. 13.

FIG. 19 is a block diagram illustrating an example of an interface employable in the computing system shown in FIG. 18 according to example embodiments.

Referring to FIG. 19, a computing system 1000 may be implemented by a data processing device that uses or supports a mobile industry processor interface (MIPI) interface. The computing system 1000 may include an application processor 1110, a three-dimensional image sensor 1140, a light source 1145, a display device 1150, etc.

A CSI host 1112 of the application processor 1110 may perform a serial communication with a CSI device 1141 of the three-dimensional image sensor 1140 via a camera serial interface (CSI). A DSI host 1111 of the application processor 1110 may perform a serial communication with a DSI device 1151 of the display device 1150 via a display serial interface (DSI).

The light source 1145 may communicate with the three-dimensional image sensor 1140 and the application processor 1110. The light source 1145 may output a modulated transmission light. The three-dimensional image sensor 1140 provides distance information based on the received light reflected from the subject and includes the depth pixel shown in FIG. 1, 2, 4, 5, 7, 8, 9, 11, or 12, thereby exactly measuring the distance to the subject without saturating the photo detection unit even when the ambient light is relatively strong. The application processor 1110 may extract distance information and may correct the distance information through an image interpolation.

The computing system 1000 may further include a radio frequency (RF) chip 1160 performing a communication with the application processor 1110. A physical layer (PHY) 1113 of the computing system 1100 and a physical layer (PHY) 1161 of the RF chip 1160 may perform data communications based on a MIPI DigRF. The application processor 1110 may further include a DigRF MASTER 1114 that controls the data communications of the PHY 1161.

The computing system 1000 may further include a global positioning system (GPS) 1120, a storage 1170, a MIC 1180, a DRAM device 1185, and a speaker 1190. In addition, the computing system 1100 may perform communications using an ultra-wideband (UWB) 1120, a wireless local area network (WLAN) 1220, a worldwide interoperability for microwave access (WIMAX) 1230, etc.

Example embodiments may be applied to a three-dimensional image sensor and an electronic device including the same. For example, example embodiments may be applied to various terminals such as a mobile phone, a smart phone, a tablet PC, a notebook computer, a personal digital assistant (PDA), a portable media player (PMP), a digital camera, a music player, a game console, a navigation system, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the example embodiments. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A depth pixel comprising:
   a photo detection unit configured to generate a light current based on a received light reflected from a subject, the received light including an ambient light component;
   an ambient light removal current source configured to generate a compensation current indicating the ambient light component in response to a power supply and at least one compensation control signal;
   a driving transistor configured to amplify an effective voltage corresponding to the light current and the compensation current; and
   a select transistor configured to output the amplified effective voltage in response to a selection signal, the amplified effective voltage indicating a depth of the subject.

2. The depth pixel of claim 1, wherein the ambient light removal current source comprises:
a first transistor connected between the power supply and the photo detection unit, the first transistor including a gate terminal configured to receive a first compensation control signal, and wherein,
the driving transistor and the select transistor are a first type transistor, and
the first transistor is a second type transistor different from the first type transistor.

3. The depth pixel of claim 2, wherein the first compensation control signal is activated in a preset period,
a magnitude of the compensation current is inversely proportional to a period of the first compensation control signal, and
the magnitude of the compensation current is proportional to a length of an activation period of the first compensation control signal.

4. The depth pixel of claim 3, wherein the period and an activation level of the first compensation control signal are changed depending on the ambient light component.

5. The depth pixel of claim 2, wherein the ambient light removal current source comprises:
a second transistor connected between the power supply and the first transistor, the second transistor including a gate terminal configured to receive a second compensation control signal; and
a third transistor connected between the first transistor and the photo detection unit, the third transistor including a gate terminal configured to receive a third compensation control signal, and wherein
the second transistor and the third transistor are both of the second type transistor.

6. The depth pixel of claim 5, wherein the first compensation control signal maintains an activation state, and
the second compensation control signal and the third compensation control signal are sequentially activated.

7. The depth pixel of claim 1, further comprising:
a transfer transistor connected between the photo detection unit and a floating diffusion node, the transfer transistor including a gate terminal configured to receive a transfer control signal; and
a reset transistor connected between the power supply and the floating diffusion node, the reset transistor including a gate terminal configured to receive a reset signal, wherein
a gate terminal of the driving transistor is connected to the floating diffusion node, and
the ambient light removal current source is connected between a first node, to which the photo detection unit and the transfer transistor are connected, and the power supply.

8. The depth pixel of claim 7, further comprising:
a photo transistor formed on the photo detection unit, the photo transistor configured to control the generation of the light current in response to a photo control signal.

9. The depth pixel of claim 7, further comprising:
a transfer control transistor connected between the gate terminal of the transfer transistor and the transfer control signal, the transfer control transistor including a gate terminal configured to receive the selection signal.

10. The depth pixel of claim 1, further comprising:
a transfer transistor connected between the photo detection unit and a floating diffusion node, the transfer transistor including a gate terminal configured to receive a transfer control signal, wherein
a gate terminal of the driving transistor is connected to the floating diffusion node, and
the ambient light removal current source is connected between the power supply and the floating diffusion node.

11. The depth pixel of claim 10, further comprising:
a refresh transistor connected between a first node and the power supply, the refresh transistor including a gate terminal configured to receive a refresh control signal, wherein
the photo detection unit and the transfer transistor are connected to the first node.

12. A three-dimensional image sensor comprising:
a light source unit configured to irradiate a modulated transmission light to a subject; and
a pixel array including a plurality of the depth pixels of claim 1, the depth pixels configured to generate distance information indicating a distance between the three-dimensional image sensor and the subject based on a received light reflected from the subject.

13. The three-dimensional image sensor of claim 12, wherein the ambient light removal current source comprises:
a first transistor connected between the power supply and the photo detection unit, the first transistor including a gate terminal configured to receive a first compensation control signal, and wherein
the driving transistor and the select transistor are a first type transistor, and
the first transistor is a second type transistor different from the first type transistor.

14. The three-dimensional image sensor of claim 13, wherein the three-dimensional image sensor is configured to,
initialize a period and an activation level of the first compensation control signal,
acquire an offset of the receive light based on the first compensation control signal having the initialized period and the initialized activation level, and
compare the acquired offset with a reference offset to determine an optimized period and an optimized activation level of the first compensation control signal.

15. The three-dimensional image sensor of claim 14, wherein
when the acquired offset is greater than the reference offset, the three-dimensional image sensor is configured to,
reduce a current period and a current activation level of the first compensation control signal, and
repeat an operation of the acquiring the offset of the received light and an operation of comparing the acquired offset with the reference offset based on the first compensation control signal having the reduced period and the reduced activation level, and
when the acquired offset is less than the reference offset, the three-dimensional image sensor is configured to,
select a current period of the first compensation control signal as the optimized period of the first compensation control signal, and
select a current activation level of the first compensation control signal as the optimized activation level of the first compensation control signal.

16. A depth pixel comprising:
a photo detector configured to generate a current based on an amount of incident light reflected onto the photo detector from a subject, the incident light including an ambient light component; and a current source configured to adjust the generated current to compensate for the ambient light component such that an output voltage indicates a distance between the depth pixel and the subject.

17. The depth pixel of claim 16, wherein the current source is configured to adjust the generated current by generating a compensation current in response to a compensation control signal, the compensation control signal being a pulse having a magnitude and a period, the period including an on-time during which the current source is activated, and during a light collection period, the depth pixel is configured to vary one or more of the period of the compensation signal, the on-time of the compensation signal and the magnitude of the compensation signal according to an intensity of the ambient light component.

18. The depth pixel of claim 17, wherein the current source is configured to generate the compensation current such that a magnitude of the compensation current varies inversely with the period of the compensation control signal and the magnitude of the compensation current varies directly with a length of the on-time of the compensation control signal.

19. The depth pixel of claim 17, wherein the photo detector is configured to detect the incident light in response to a photo control signal, and wherein the photo control signal and a light transmitted onto the subject both have a first phase, and the incident light reflected onto the photo detector has a second phase that is different from the first phase, and a phase difference between the first phase and the second phase indicates a time of flight for a signal to travel between the depth pixel and the subject.

20. The depth pixel of claim 19, wherein, during a read period after the light collection period, the depth pixel is configured to, sample voltages at a floating diffusion node after transferring the adjusted current to the floating diffusion node, the floating diffusion node connected to the photo detector and the current source;

determine the phase difference based on the sampled voltages; and determine the distance between the depth pixel and the subject based on the determined phase difference and a frequency of the incident light.

* * * * *